BAND SELECTING AMPLIFIERS
Filed Nov. 26, 1951
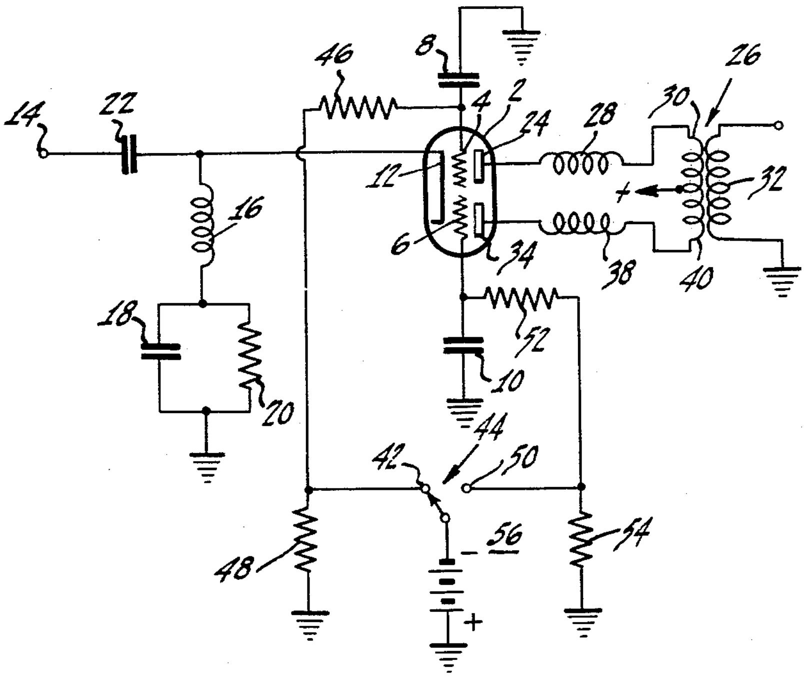
INVENTOR
GEORGE W. GRAY
BY
Olin V. Mitchell
ATTORNEY United States Patent Office 2,716,161

Patented Aug. 23, 1955

2,716,161

BAND SELECTING AMPLIFIERS

George W. Gray, Lambertville, N. J., assignor to Radio Corporation of America, a corporation of Delaware Application November 26, 1951, Serial No. 258,176

3 Claims. (Cl. 179—171)

This invention relates to a band selecting amplifier in which the band selection is accomplished by application of D. C. potentials and wherein each band is amplified by a greater amount than in other arrangements.

Band selecting amplifiers have a wide field of use in the art of electronics and are especially useful in the "head end" of television receivers. As is well known to those skilled in the art, the television channels 2 through 6 are allotted to the frequencies between 54 and 88 megacycles and the channels 7 through 13 are allotted to the frequencies between 174 and 216 megacycles. It is therefore desirable to provide a head end for a television receiver that is responsive to these separated bands and not responsive to frequencies lying outside these bands.

It is the object of the present invention to provide an improved amplifier for selecting one of two bands under the control of D. C. potentials.

It is a further object of this invention to provide a band selection amplifier in which the power gain of the signal selected is greatly increased.

Briefly, these objectives may be accomplished by grounding the grids of a twin triode amplifier, connecting the cathodes in common to the source of incoming signal and connecting the plates to differently tuned plate load impedances.

Referring to the drawing there is shown an amplifier tube 2 having its grids 4 and 6 coupled to ground by condensers 8 and 10 respectively. A common cathode 12 is coupled to the input terminal 14 by a broad band circuit network. It will be understood that separate cathodes are for the present purpose a full equivalent of a common cathode if they are electrically connected. Various types of broad band networks may be employed but in this particular showing the cathode is connected to ground via an inductance 16 that is connected in series with a parallel combination of a condenser 18 and a resistor 20. A coupling condenser 22 is connected between the input terminal 14 and the common cathode 12. Owing to the low impedances of the cathode 12, the coupling circuit just described may be tuned so as to cover more than one band of incoming signal frequency. In television, for example, the circuit may be broad enough so as to be responsive to voltages in both television bands. A plate 24 that is adapted to receive electrons under the control of the grid 4 is coupled to a source of B+ voltage by one half of the primary of an output transformer 26. In this schematic showing the inductance 28 represents the combination of leakage inductance and reflected inductance from secondary to primary of transformer 26 while the inductance 30 represents the portion of the primary that has unity coupling with a secondary 32. In a similar fashion a plate 34 that receives electrons under the control of the grid 6 is coupled to the same source of B+ potential via the other half of the primary 30. Here again the lumped leakage and reflected inductance viewed from the primary is represented by an inductance 38 and the portion of the primary that is coupled with unity coupling to the secondary 32 is indicated by the numeral 40. This method of illustrating transformer constructional parameters is well known in the art, e. g., see page 375 of the "Radio Engineering Handbook" by Henney, 3rd edition.

The grid 4 is coupled to one contact 42 of a switch 44 by a resistor 46. The contact 42 is connected to ground via a resistor 48. In similar fashion the grid 6 is connected to another contact 50 of the switch 44 via a resistor 52 and the contact 50 is connected to ground via a resistor 54. The movable arm 56 of the switch 44 is connected to the negative end of a source of D. C. potential and the positive end of the source is connected to ground. The amount of D. C. potential supplied by the source is sufficient to bias off either half of the twin amplifying tube 2. In the position shown, the arm 56 is connected to the contact 42, and therefore the part of the twin triode associated with the grid 4 and the plate 24 is cut off. If the arm 56 were switched to the contact 50 the part of the twin triode associated with the grid 6 and the plate 34 would be cut off.

When one section of the tube 2 is turned off by the switching described above, it does not load down the common cathode circuit. Consequently the gain of the half of the tube that is operating is increased. Then too, direct current is drawn by only one half of the tube so that the overall power efficiency is increased.

In accordance with the present invention the plate circuit associated with anode 24 is made resonant to a different band of frequencies than the plate circuit associated with plate 34. Thus the primary inductance 30 along with the lumped inductance 28 is so proportioned relative to the total circuit capacitance in shunt with the anode 24 to provide a typical resonant load circuit embracing a first band of frequencies. Correspondingly, the primary inductance 40 along with the lumped inductance value 38 is so proportioned relative to the total circuit capacitance in shunt with the anode 24 to resonate at a second band of frequencies. Since both the inductance primary sections 30 and 40 are magnetically coupled to the secondary 32 it will, therefore, be seen that the overall amplifier response will depend upon which tube section of envelope 2 is permitted to conduct as may be selected by switch 44.

If a 6J6 amplifier were operated with both sections in parallel it would be possible from a theoretical point of view to produce a power gain of 2 in both of the television bands referred to above. However, if a 6J6 amplifying tube is employed in this new type of circuit it is theoretically possible to obtain a power gain of 6 for each band. Thus with the same tube it is possible to get three times the power gain for both television bands by the addition of a simple D. C. switch.

What is claimed is:

1. A band selecting amplifier comprising in combination a first electron discharge device having at least a cathode, a grid and a plate, a second electron discharge device having a cathode, grid and a plate, each of said discharge tube plates having a degree of shunt capacitance, an input circuit having a sufficiently broad response to cover two bands of frequencies coupled to said cathodes, a condenser connected between each grid and ground, said condensers having a low impedance for either of said frequency bands, a source of negative grid bias potential of sufficient value to produce plate current cutoff in either of said discharge devices, switching means connected with said bias potential source and said grids for selectively applying sufficient negative potential to said grids so as to bias one or the other electron discharge device to cut-off, an output transformer having a primary and a secondary, a source of positive potential, said source being connected to an intermediate point of said primary, one end of said primary being connected to the plate of said first electron discharge device, the other end of said primary being connected to the plate of the second electron discharge device, the overall inductance of the sections of the primary between the source of positive potential and each plate taken in combination with each plate shunt capacitance forming circuits that are resonant respectively to a different one of said bands of frequencies.

2. A grounded grid type of amplifier circuit for selectively passing a first band or second band of signal frequencies having no common signal frequency, the combination of: a signal ground; a pair of grounded grid amplifiers having a common cathode connection, a separate grid and a separate plate; an amplifier input circuit having substantial response to both of said bands of signal frequencies and connected to said amplifier cathode connection and said signal ground; a source of grid bias plate current cutoff potential reference connected with said ground; selective switching means connected from said bias source to each of said grids whereby to alternately establish plate current cutoff in said amplifiers; a source of plate potential reference connected with said ground; a first resonant load circuit tuned to said first band of signal frequencies and connected with one of said amplifier plates and said plate potential source; a second resonant load circuit tuned to said second band of signal frequencies and connected with said plate potential source and the other of said amplifier plates; and signal combining means coupled with each of said resonant load circuits and a signal delivery terminal.

3. A grounded grid amplifier circuit according to claim 2 wherein said first and second resonant load circuits comprise an output transformer having a tapped primary winding, the primary tap being connected with said plate potential source while the extremities of said primary winding are each connected with a different amplifier plate and wherein said signal combining means is a secondary winding on said transformer magnetically coupled to said primary winding.

References Cited in the file of this patent

UNITED STATES PATENTS

| | | |
|---|---|---|
| 1,666,158 | Affel | Apr. 17, 1928 |
| 1,993,859 | Roberts | Mar. 12, 1935 |
| 2,219,396 | Plebanski | Oct. 29, 1940 |
| 2,502,687 | Weiner | Apr. 4, 1950 |
| 2,546,338 | Glasford et al. | Mar. 27, 1951 |

FOREIGN PATENTS

| | | |
|---|---|---|
| 515,762 | Great Britain | Dec. 13, 1939 |

OTHER REFERENCES

RCA Review, vol. XII, Issue 1, pages 3–26, March 1951, page 6 pertinent. (Copy in Division 69.)